May 26, 1931. P. T. FARNSWORTH 1,806,935
LIGHT VALVE
Original Filed Jan. 7, 1927
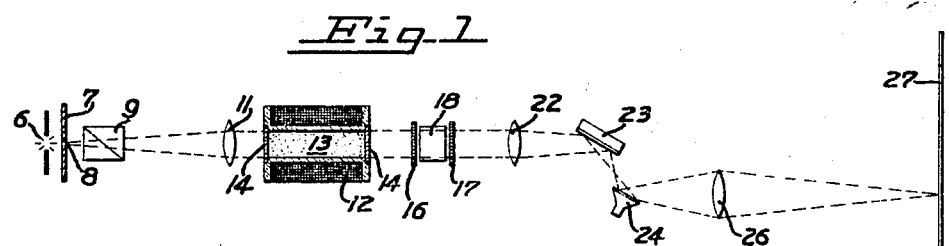
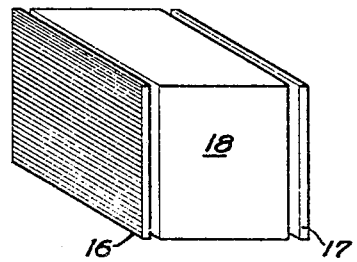
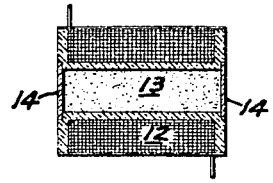
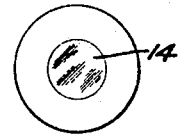
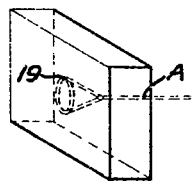
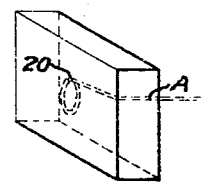
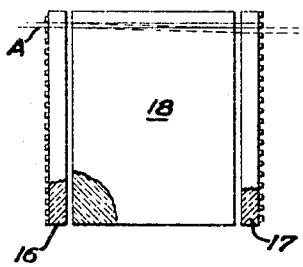
INVENTOR
PHILO T. FARNSWORTH
BY Charles S. Evans
HIS ATTORNEY.

Patented May 26, 1931

1,806,935

UNITED STATES PATENT OFFICE

PHILO T. FARNSWORTH, OF BERKELEY, CALIFORNIA, ASSIGNOR, BY MESNE ASSIGN-
MENTS, TO TELEVISION LABORATORIES, INC., OF SAN FRANCISCO, CALIFORNIA, A
CORPORATION OF CALIFORNIA

LIGHT VALVE

Original application filed January 7, 1927, Serial No. 159,540. Divided and this application filed November 7, 1927. Serial No. 231,689.

This application is a division of my copending application, Serial No. 159,540, filed January 7, 1927.

My invention relates to an apparatus for modulating a beam of light, and its broad object is to accomplish such modulation in accordance with changes in the strength of an electric current.

Another object of my invention is to provide a shutter or modulator for use in the receiver of a television system.

Another object of my invention is to provide a light valve which has no moving mechanical parts.

Another object is to produce a light valve in which very small changes in current are sufficient to effect the modulation.

My invention possesses other objects and features of advantages, some of which, with the foregoing, will be set forth in the following description of my invention which is illustrated in the drawings accompanying and forming part of the specification. It is to be understood that I do not limit myself to the showing made by the said description and drawings, as I may adopt varying forms of my invention as set forth in the claims.

Referring to the drawings:

Fig. 1 shows diagrammatically by invention as used in a television receiver.

Fig. 2 is a view in orthographic projection of the light occluding means or shutter.

Fig. 3 is a sectional view of the light rotator, the plane of section being on the longitudinal axis; and Fig. 4 is an end elevation thereof.

Fig. 5 is a view in orthographic projection of a bi-axial crystal showing the conical refraction of unpolarized light; and Fig. 6 is a similar view showing the refraction of polarized light.

Fig. 7 is a side view of the shutter partly in section, showing the path of the light through the gratings.

Broadly stated, my invention comprises the generation of a pencil of light rays from a constant source. The rays are then polarized, and rendered parallel, after which they are passed thru a device for rotating the plane of polarization in accordance with the strength of an electric current. They next pass thru a pair of optical gratings, between which is a bi-axial crystal having an optical axis parallel to the path of the rays. The position of the shadow of the first grating upon the second depends upon the plane of polarization of the light. If the shadow of the bars of the grating falls upon the interstices of the second, the beam is completely extinguished. When the plane of polarization is rotated, however, the shadow moves, and when the shadow of the bars of the first grating falls upon those of the second a maximum of light is transmitted. There is thus produced a beam of light whose intensity fluctuates in accordance with an electric current, and this beam may be focused and reflected from a pair of co-operating oscillographs which cause it to scan a screen and form a picture.

I am aware that the rotation of polarized light to effect its modulation is not new. In the past, however, the method has been to use Nicol prisms with a cell for electrically rotating the plane of polarization between them. This apparatus, however, requires a rotation of 90 degrees to effect the change from complete illumination to complete extinction, whereas with the device of my invention this change may be accomplished by a rotation of 2 degrees, 1 degree, or even less, depending upon the bi-axial crystal and gratings used.

In detail, the construction and operation of a preferred form of my device are as follows: Preferably there is employed a source of light of constant intensity, such as an arc light 6 and to obtain a pencil of light therefrom, there is placed a diaphragm 7 with a small aperture 8 in front of the arc light. The light from said diaphragm is then passed through a polarizer 9. The polarizer is indicated as preferably in the form of a Nicol prism. The polarized light from the Nicol prism 9 is then passed through a lense 11 which parallels the polarized light and the paralleled light is then passed through a device for rotating the plane of the polarized light. This device may be any device suitable for rotating the plane of the polarized light in accordance with the fluctuations of the light current received at the receiver. The preferred form of such device is illustrated as comprising a means for producing a magnetic field fluctuating in accordance with the light current, such as the coil 12, surrounding an electrically optically active medium 13, such for example as a thin film of iron, cobalt, or nickel, or carbon disulfide, glass, or any other material in which a beam of polarized light rotates considerably when subjected to a magnetic field. I prefer to employ carbon disulfide and said carbon disulfide is held in the core of the coil 12 by glass plates 14.

The light from the light rotator is then passed through a shutter or device adapted for restricting the passage of light in accordance with its degree of rotation. I preferably employ a combination of a pair of gratings 15 and 17 and a bi-axial crystal 18. The gratings 16 and 17 may be any usual form of light gratings, for example, rules upon a silvered transparent surface, and are placed at opposite ends or sides of the bi-axial crystal so that as the light passes thru them, the shadow of the bars of the first grating is cast upon the interstices of the second. The bi-axial crystal employed between the gratings is mounted so that the refracted ray is along an optical axis in order to produce a conical refraction of the light. As an example of a suitable crystal of this kind, I have employed a crystal of aragonite one centimeter thick between the gratings ruled with 100 lines per millimeter. With this combination, the rotation between complete extinction and complete restoraton is of the order of two degrees. Thus with this analyzer, very small currents may be employed upon the rotator, permitting the use of a coil of very high natural period.

The operation of this analyzer will be understood from Figures 5, 6 and 7, in which Figures 5, 6 and 7 there is disclosed how a rotation of a few degrees will change complete extinction to complete restoration. A indicates a beam of light passing through the first grating 16 and hence through the bi-axial crystal 18 to the second grating 17, the lines of which are opposed to the lines of the grating 16. If the beam of light passes through the bi-axial crystal in its plane of incidence, it is completely extinguished by the lines of the grating but if the plane of polarization of the beam A is rotated slightly, the ray A will take the direction of the dotted lines through the crystal and pass between the lines of the grating, a slight difference in refraction of the light in the bi-axial crystal being sufficient for this purpose.

In explanation of the action of the bi-axial crystal 18, it is understood that the light is directed on said crystal along one of its optic axes. When this is done, the light is refracted to an extent depending on the position of the plane of polarization. When unpolarized light from an aperture is directed on such a crystal along one of its axes, said light will appear as a circle 19 from the other side of the crystal, as shown in Fig. 5, but when a beam of polarized light is directed along one of the axes of the crystal, it appears as a point of light 20 lying in the circle produced by the unpolarized light, but its position is dependent on the position of the plane of polarization of the beam of light. A 90 degree rotation of the plane of polarization of the beam of light will rotate the light from the crystal from one side of the circle to the opposite side. The two extreme positions of the polarized beam of light are indicated in Figure 5, by the two branches of the beam of light A. During the passage of the light through the bi-axial crystal, the wave front of the beam of light remains parallel and the wave front of the beam passes through perpendicularly to the optic axis of the crystal.

By means therefore, of the polarizer 9, light rotator and analyzer comprising the gratings 16 and 17 and the bi-axial crystal 18, the constant supply of light through arc light 6 is caused to produce a light of varying intensity, varying in accordance with the intensity of the light current supplied to the coil 12. Thereby, without the employment of any mechanical moving apparatus, the light current is reconverted into light.

Such light is then passed through a lens 22 by which it is focused upon a pair of co-operating oscillographs 23 and 24. Said co-operating oscillographs 23 and 24 are positioned at right angles one to the other and so that the light from one strikes the other oscillograph. Said oscillographs are operated at different frequencies with the result that the light is by said oscillographs projected in horizontal vibrations, which are successively lowered or raised vertically so that the light can pass through a lens 26 upon a screen 27 and covers successively an entire rectangular area of said screen.

It is to be understood that I have cited aragonite as the bi-axial crystal used in my device merely for illustrative purposes, as any of the materials so classified may be substituted. Sulphur and dextro-tartaric acid may be mentioned as substances possessing the property of conical refraction to a high degree.

I claim:

1. A shutter for polarized light comprising gratings positioned transverse the path of the light, a bi-axial crystal interposed between the gratings and positioned so that the refracted rays are along an optical axis, said gratings and crystal having the property and being positioned with respect to the light beam whereby the light is transmitted in accordance with the angle of its plane of polarization.

2. A shutter for polarized light comprising gratings positioned transverse the path of the light, means interposed between said gratings for conically refracting the light, the gratings and conically refracting means having the property and being positioned with respect to the light beam whereby the light is transmitted in accordance with the angle of its plane of polarization.

3. A valve for polarized light comprising electrical means for rotating the plane of polarization of the light, gratings transverse the rotated beam of light, means interposed between the gratings for conically refracting the light, said gratings and conically refracting means having the property and being positioned with respect to the light beam whereby the light is transimtted in accordance with the angle of its plane of polarization.

4. A device for modulating a beam of light in accordance with electrical impulses comprising a polarizer, a medium for rotating the plane of the polarized light in accordance with electrical impulses, means for imparting the stress from the electrical impulses to the medium, gratings positioned transverse the beam of rotated light, means interposed between said gratings for conically refracting the light, said gratings and means having the property and being positioned with respect to the light beam to proportionately diminish the intensity of the light transmitted as the plane of polarization is rotated.

5. A device for modulating a beam of polarized light in accordance with electrical impulses comprising electrically responsive means for rotating the plane of polarization of the light, gratings positioned transverse the beam of rotated light, means interposed between said gratings for conically refracting the light, said gratings and said means having the property and being positioned with respect to the light beam to proportionately diminish the intensity of the light transmited as the plane of polarization is rotated.

In testimony whereof, I have hereunto set my hand.

PHILO T. FARNSWORTH.